G. W. WELLS.
LEAK ALARM FOR PNEUMATIC TIRES.
APPLICATION FILED FEB. 17, 1916.
1,195,883.
Patented Aug. 22, 1916.
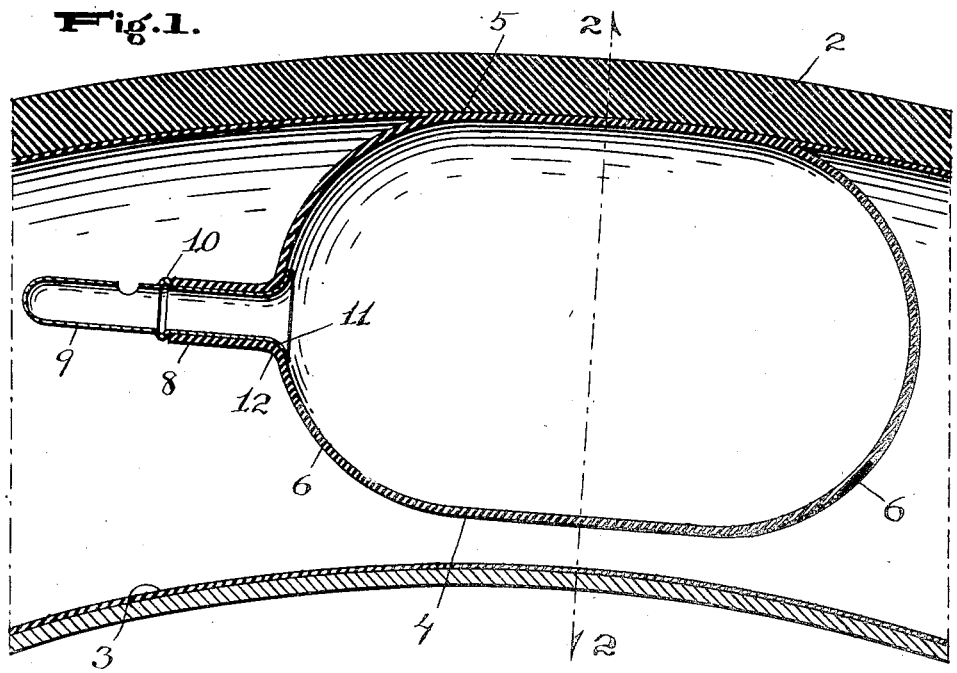
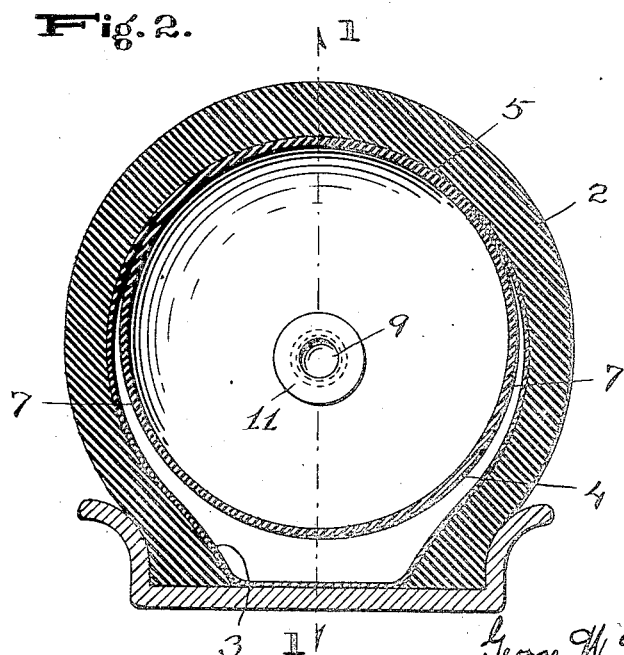

UNITED STATES PATENT OFFICE.

GEORGE W. WELLS, OF AMESBURY, MASSACHUSETTS, ASSIGNOR TO WALKER-WELLS COMPANY, OF AMESBURY, MASSACHUSETTS, A CORPORATION OF MASSACHUSETTS.

LEAK-ALARM FOR PNEUMATIC TIRES.

1,195,883.　　　　　Specification of Letters Patent.　　Patented Aug. 22, 1916.

Application filed February 17, 1916. Serial No. 78,942.

*To all whom it may concern:*

Be it known that I, GEORGE W. WELLS, a citizen of the United States, resident of Amesbury, in the county of Essex and State of Massachusetts, have made a certain new and useful Invention in Leak-Alarms for Pneumatic Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a section upon the line 1—1, Fig. 2. Fig. 2 is a cross section of a portion of a wheel having the invention applied thereto, upon the line 2—2 Fig. 1.

The invention has relation to leak alarms for pneumatic tires, and it consists in the novel construction and combinations of parts, as hereinafter set forth.

In the accompanying drawings, illustrating the invention, the numeral 2 designates the outer tube of a pneumatic tire, 3 the inner tube thereof and 4 a rubber bulb vulcanized to or made an integral part of the inner tube, at one side, as at 5. This rubber bulb is made of hollow spherical form, or it may be of oblong form, as shown, with rounded, semi-spherical ends 6 and transversely rounded sides 7, one of said sides being connected to the inner tube, as stated. The bulb is at one end provided with an outwardly extending neck 8, and fitting within said neck is a whistle or squawker 9, usually detachable and having a shoulder 10, bearing against the outer end of said neck, and an outwardly curved or flaring inner end 11, fitting neatly against the curved joint 12 of the neck with the body of the bulb.

In the operation of this device, when the tube has become deflated to a certain predetermined extent, depending upon the diameter of the bulb, the bulb will at its free inner side take a bearing against the rigid inner side of the outer tube, and be compressed, forcing the air from the bulb through the whistle and sounding the alarm. The whistle, being located upon the inside of the tire, does not require mutilation of the tire or of the wheel felly for extension of the alarm therethrough, and will yet give an effective alarm, as found in practical use.

The invention is easily applied to the inner tube of any pneumatic tire, and will serve an efficient purpose.

I claim:

1. A leak alarm for pneumatic tires, comprising a compressible member located within the inner tube of the tire, said member having an alarm device located within the inner tube and operable to sound the alarm upon compression of said member by deflation of the tire.

2. A leak alarm for pneumatic tires, comprising a compressible rubber bulb located within the inner tube of the tire, said bulb having an alarm device located within the inner tube and operable to sound the alarm upon compression of said bulb by deflation of the tire.

3. A leak alarm for pneumatic tires, comprising a compressible rubber bulb located within the inner tube of the tire, said bulb having an outwardly extending neck, and a detachable alarm device engaging said neck, located within the inner tube and operable to sound the alarm upon compression of said bulb by deflation of the tire.

4. A leak alarm for pneumatic tires, comprising a compressible rubber bulb located within and connected to the inner tube of the tire and of less diameter than that of said tube, said bulb having at one end an alarm device located within the inner tube and operable to sound the alarm upon compression of said bulb by deflation of the tire.

5. A leak alarm for pneumatic tires, comprising a compressible rubber bulb located within and connected to the inner tube of the tire and of less diameter than that of said tube, said bulb having at one end an outwardly extending neck, and a detachable alarm device engaging said neck, located within the inner tube and operable to sound the alarm upon compression of said bulb by deflation of the tire.

In testimony whereof I affix my signature, in presence of two witnesses.

GEORGE W. WELLS.

Witnesses:
　JULIA A. HOLMSTROM,
　CHARLES I. PETTINGELL.

It is hereby certified that Letters Patent No. 1,195,883, granted August 22, 1916, upon the application of George W. Wells, of Amesbury, Massachusetts, for an improvement in "Leak-Alarms for Pneumatic Tires," were erroneously issued to "Walker-Wells Company" as owner of the entire interest in said improvement, whereas said Letters Patent should have been issued to *the patentee, said Wells, and Walker-Wells Company,* said corporation being owner of *one-half* interest only, as shown by the records of assignments in this office; and that the said Letters Patent should be read with this correction therein that the same may conform to the record of the case in the Patent Office.

Signed and sealed this 22d day of July, A. D., 1919.

[SEAL.]

R. F. WHITEHEAD,

*Acting Commissioner of Patents.*